(12) United States Patent
Matsui et al.

(10) Patent No.: US 10,089,047 B2
(45) Date of Patent: Oct. 2, 2018

(54) DATA PROCESSING DEVICE AND NON-TRANSITORY COMPUTER READABLE MEDIUM FOR RECEIVING PRINT REQUEST DATA WITH USER PROPERTY DATA

(71) Applicant: FUJI XEROX CO., LTD., Tokyo (JP)

(72) Inventors: Kenki Matsui, Yokohama (JP); Yuta Yamaguchi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/258,431

(22) Filed: Sep. 7, 2016

(65) Prior Publication Data

US 2017/0286031 A1    Oct. 5, 2017

(30) Foreign Application Priority Data

Mar. 29, 2016    (JP) .................. 2016-065296

(51) Int. Cl.
    *G06F 3/12*    (2006.01)
(52) U.S. Cl.
    CPC .......... *G06F 3/1255* (2013.01); *G06F 3/1205* (2013.01); *G06F 3/1208* (2013.01); *G06F 3/1239* (2013.01); *G06F 3/1268* (2013.01); *G06F 3/1285* (2013.01)
(58) Field of Classification Search
    None
    See application file for complete search history.

(56) References Cited

U.S. PATENT DOCUMENTS

| 2011/0242560 | A1* | 10/2011 | Yamada | ............... G03G 15/556 |
|---|---|---|---|---|
| | | | | 358/1.9 |
| 2012/0194858 | A1* | 8/2012 | Matsushita | ........ G06K 15/1823 |
| | | | | 358/1.15 |

FOREIGN PATENT DOCUMENTS

JP    2008-090721 A    4/2008

* cited by examiner

*Primary Examiner* — Andrew H Lam
(74) *Attorney, Agent, or Firm* — Oliff PLC (57) ABSTRACT

A data processing device includes a receiving unit that receives printing request data which indicates a request for printing of a document, the printing request data including user property data indicating a property of a user of a printed matter and number-of-printed-copies data indicating a number of copies corresponding to the user property data; an acquiring unit that acquires, from a storage device that stores condition data indicating a condition related to a printing setting corresponding to the user property data, the condition data corresponding to the user property data with respect to the user property data; and an instructing unit that instructs a printing device to print the document by the number of copies indicated by the number-of-printed-copies data corresponding to the user property data based on a printing setting satisfying a condition indicated by the condition data corresponding to the user property data.

11 Claims, 8 Drawing Sheets

USER ID: 1234                                                T1

| SETTING ITEM | SETTING VALUE | PRESENCE OR ABSENCE OF AUTHORITY |
|---|---|---|
| COLOR/BLACK AND WHITE | COLOR | ABSENCE |
|  | BLACK AND WHITE | PRESENCE |
| SINGLE SIDE/DOUBLE SIDE | SINGLE SIDE | PRESENCE |
|  | DOUBLE SIDE | PRESENCE |
| ⋮ | ⋮ | ⋮ |

FIG. 6

ROLE NAME: MANAGER                     T2

| SETTING ITEM | SETTING VALUE |
|---|---|
| COLOR/BLACK AND WHITE | COLOR |
| SINGLE SIDE/DOUBLE SIDE | SINGLE SIDE |
| ⋮ | ⋮ |

ROLE NAME: GENERAL STAFF    T3

| SETTING ITEM | SETTING VALUE | PRESENCE OR ABSENCE OF AUTHORITY | COMPETITION SETTING VALUE | REPLACEMENT SETTING VALUE |
|---|---|---|---|---|
| COLOR/BLACK AND WHITE | COLOR | ABSENCE | — | BLACK AND WHITE |
| | BLACK AND WHITE | PRESENCE | — | — |
| SINGLE SIDE /DOUBLE SIDE | SINGLE SIDE | ABSENCE | — | DOUBLE SIDE |
| | DOUBLE SIDE | PRESENCE | BINDING "COVERED BINDING" | — |
| ⋮ | ⋮ | ⋮ | ⋮ | ⋮ |

| NOTIFICATION CONDITION | NOTIFICATION CONTENTS |
|---|---|
| AMOUNT OF INCREASE IN THE NUMBER OF PAGES ≧ 1 | THE NUMBER OF PAGES IS INCREASED BY # |
| USE OF HIGH-QUALITY SHEET | HIGH-QUALITY SHEET IS USED |
| GENERATION OF NON-PRINTING INFORMATION | A PORTION OF INFORMATION IS NOT PRINTED |
| ⋮ | ⋮ |

| USER NAME | ROLE |
|---|---|
| Mr. A | MANAGER, SENIOR |
| Mr. B | GENERAL STAFF, SENIOR |
| Mr. C | GENERAL STAFF |
| Mr. D | GENERAL STAFF, SENIOR |
| ⋮ | ⋮ |

| SETTING ITEM | ORDER OF PRIORITY |
|---|---|
| COLOR/BLACK AND WHITE | COLOR, BLACK AND WHITE |
| SINGLE SIDE/DOUBLE SIDE | SINGLE SIDE, DOUBLE SIDE |
| ⋮ | ⋮ |

| CHANGE CONDITION | CHANGE CONTENTS |
|---|---|
| GENERATION OF NON-PRINTING INFORMATION | SHEET SIZE: A4 → B4 |
| STAPLE REGION INCLUDES INFORMATION | STAPLE PROCESSING: PERFORM → DO NOT PERFORM |
| ⋮ | ⋮ |

| CHANGE CONDITION | CHANGE CONTENTS |
|---|---|
| GENERATION OF NON-PRINTING INFORMATION | ENLARGEMENT OF REGION IN DIRECTION IN WHICH FONT SIZE IS LARGE |
| SEPARATION OF FIGURE AND TITLE | REDUCTION IN SIZE OF FIGURE |
| OCCURRENCE OF DEVIATION OF SPREAD PAGE | INSERTION OF WHITE SHEET PAGE |
| ⋮ | ⋮ |

T8

DATA PROCESSING DEVICE AND NON-TRANSITORY COMPUTER READABLE MEDIUM FOR RECEIVING PRINT REQUEST DATA WITH USER PROPERTY DATA

CROSS-REFERENCE TO RELATED APPLICATIONS

This application is based on and claims priority under 35 USC 119 from Japanese Patent Application No. 2016-065296 filed on Mar. 29, 2016.

BACKGROUND

Technical Field

The present invention relates to a data processing device, a data processing method, and a non-transitory computer readable medium.

SUMMARY

According to an aspect of the invention, there is provided a data processing device including: a receiving unit that receives printing request data which indicates a request for printing of a document, the printing request data including one or more pieces of user property data indicating a property of a user of a printed matter and number-of-printed-copies data indicating a number of copies corresponding to each of the one or more pieces of user property data; an acquiring unit that acquires, from a storage device that stores condition data indicating a condition related to a printing setting corresponding to each of the one or more pieces of user property data, the condition data corresponding to the user property data with respect to each of the one or more pieces of user property data; and an instructing unit that instructs a printing device to print the document by the number of copies indicated by the number-of-printed-copies data corresponding to the user property data based on a printing setting satisfying a condition indicated by the condition data corresponding to the user property data with respect to each of the one or more pieces of user property data.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
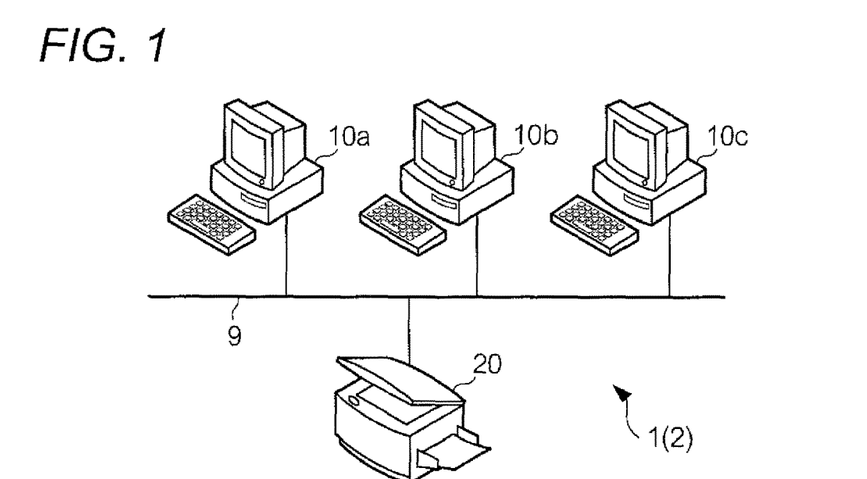
FIG. 1 is a schematic diagram showing a configuration of a printing system according to a first exemplary embodiment.

FIG. 1 is a schematic diagram showing a configuration of a printing system 1 according to a first exemplary embodiment of the invention. The printing system 1 includes client devices 10a, 10b, and 10c and an image forming apparatus 20. The client devices 10a, 10b, and 10c are devices that are operated by a user and are, for example, personal computers. The client devices are referred to as a "client device 10" in a case where it is not necessary to distinguish the client devices 10a, 10b, and 10c from each other.

The image forming apparatus 20 performs processes such as an image forming process (printing process) of forming an image on a medium and an image reading process of reading an image formed on a medium, and is an apparatus that provides services, such as copying, scanning, and printing, to a user. The image forming apparatus 20 is shared by plural users. Each of the client devices 10 and the image forming apparatus 20 perform data communication through a communication line 9. The communication line 9 may be, for example, any of the Internet, a mobile communication network, and a telephone line.

Figure 2:
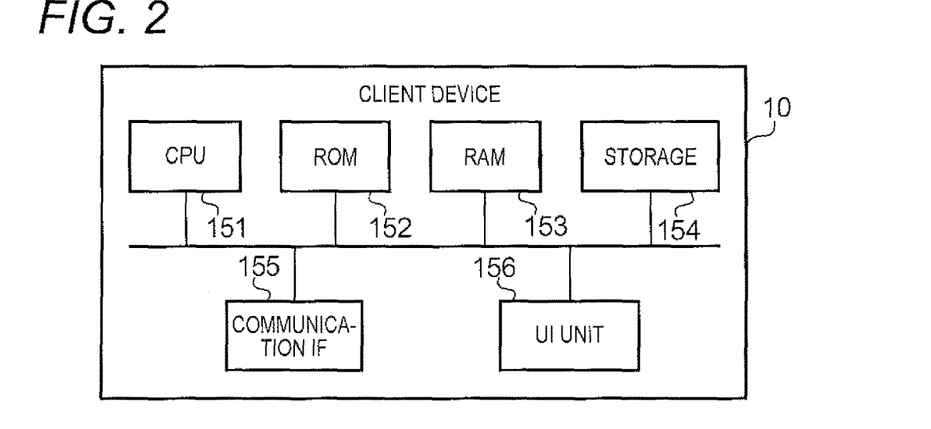
FIG. 2 is a diagram showing a hardware configuration of a client device according to the first exemplary embodiment.

FIG. 2 is a diagram showing a hardware configuration of the client device 10. The client device 10 includes a central processing unit (CPU) 151, a read only memory (ROM) 152, a random access memory (RAM) 153, a storage 154, a communication IF 155, and a UI unit 156. The CPU 151 is a control device that controls each unit of the client device 10. The ROM 152 is a nonvolatile storage device that stores programs and data. The RAM 153 is a main volatile storage device that functions as a work area when the CPU 151 executes a program. The storage 154 is a nonvolatile auxiliary storage device that stores programs and data. The communication IF 155 is an interface for performing communication with the image forming apparatus 20 through the communication line 9. The UI unit 156 includes, for example, a touch screen and keys.

Figure 3:
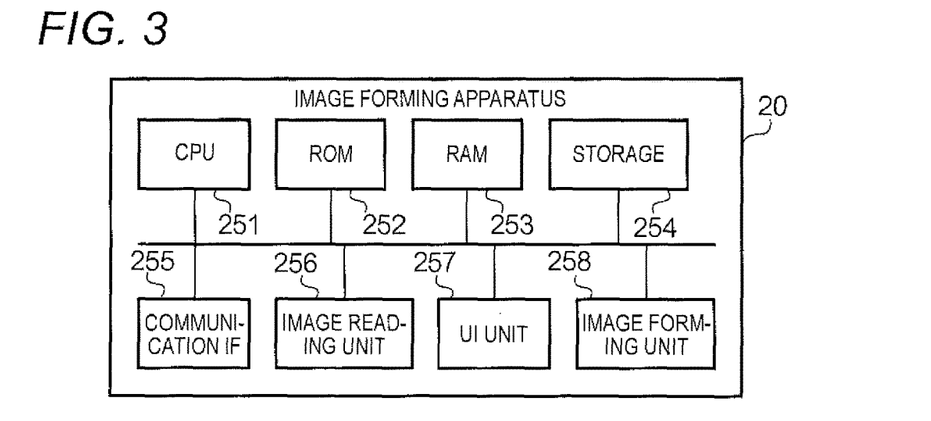
FIG. 3 is a diagram showing a hardware configuration of an image forming apparatus according to the first exemplary embodiment.

FIG. 3 is a diagram showing a hardware configuration of the image forming apparatus 20. The image forming apparatus 20 includes a CPU 251, a ROM 252, a RAM 253, a storage 254, a communication IF 255, an image reading unit 256, a UI unit 257, and an image forming unit 258.

The CPU 251 is a control device that controls each unit of the image forming apparatus 20. The ROM 252 is a nonvolatile storage device that stores programs and data. The RAM 253 is a main volatile storage device that functions as a work area when the CPU 251 executes a program. The CPU 251, the ROM 252, and the RAM 253 configure a computer.

The storage 254 is a nonvolatile auxiliary storage device that stores programs and data. The communication IF 255 is an interface for performing communication with the client device 10 through the communication line 9.

The image reading unit 256 performs an image reading process of reading an image drawn on an original document using, for example, a charge coupled device (CCD) system. The UI unit 257 includes, for example, a touch screen and keys. The image forming unit 258 forms an image based on image data on a medium such as a sheet using, for example, an electrophotographic system. Meanwhile, the above-mentioned systems used for the reading and forming of an image are examples, and other systems may be used.

Figure 4:
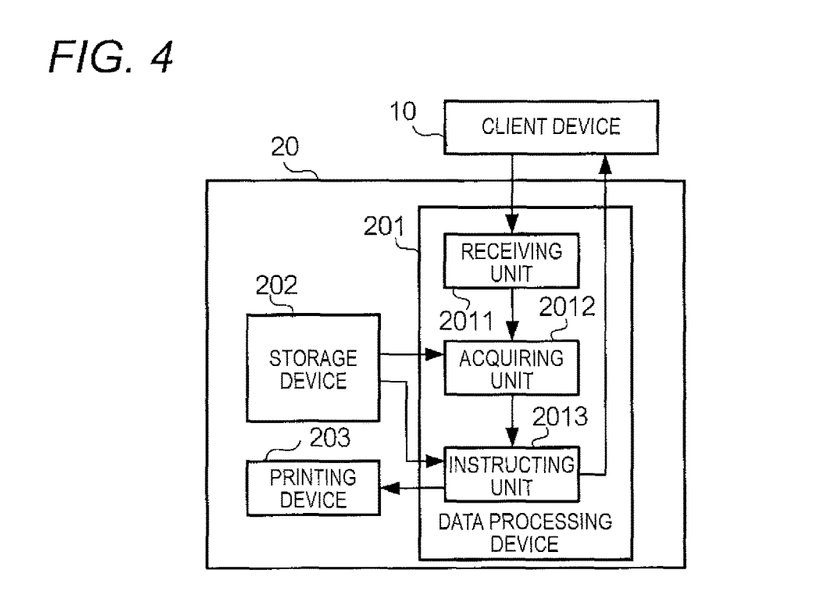
FIG. 4 is a diagram showing an example of a functional configuration of the image forming apparatus according to the first exemplary embodiment.

FIG. 4 is a diagram showing an example of a functional configuration of the image forming apparatus 20. The image forming apparatus 20 includes a data processing device 201, a storage device 202, and a printing device 203. The storage device 202 is realized by the storage 154. The printing device 203 is realized by the image forming unit 258.

The data processing device 201 is realized by the CPU 251, configuring the computer included in the image forming apparatus 20, which executes a program stored in the storage 254. The data processing device 201 includes a receiving unit 2011, an acquiring unit 2012, and an instructing unit 2013. That is, the program stored in the storage 254 causes the computer included in the image forming apparatus 20 to function as the receiving unit 2011, the acquiring unit 2012, and the instructing unit 2013.

The image forming apparatus 20 receives a user's printing request from the client device 10 and performs printing based on the printing request. The user can designate a property of a user of printed matter printed by the image forming apparatus 20 to thereby instruct the image forming apparatus 20 to perform printing based on a printing setting of the user of the printed matter without performing a printing setting. In the following description, a user of the client device 10 will be referred to as a "requester of printing" or will be simply referred to as a "requester", and is distinguished from a user of printed matter. In addition, in the following description, in a case of being simply called a "user", the user means a user of printed matter.

The receiving unit 2011 receives printing request data from the client device 10. The printing request data received from the client device 10 by the receiving unit 2011 is classified into two types of data depending on the type of data included therein.

(1) Printing request data including a user identifier (ID) for identifying a requester of printing, document data indicating a document to be printed, and the-number-of-printed-copies data indicating the number of copies. Hereinafter, the printing request data will be referred to as "normal printing request data". (2) Printing request data including a user ID for identifying a requester of printing, document data indicating a document to be printed, one or more pieces of user property data indicating a user's property, and the-number-of-printed-copies data indicating the number of copies corresponding to each of one or more pieces of user property data. Hereinafter, the printing request data will be referred to as "property designating printing request data".

Document data is accompanied by printing setting data indicating a printing setting.

In a case where the receiving unit 2011 has received property designating printing request data, the acquiring unit 2012 acquires printing setting data indicating printing settings respectively corresponding to one or more pieces of user property data included in the property designating printing request data from the storage device 202.

In a case where the receiving unit 2011 has received normal printing request data, the instructing unit 2013 instructs the printing device 203 to print a document indicated by document data included in the normal printing request data by the number of copies indicated by the-number-of-printed-copies data included in the normal printing request data, in accordance with a printing setting indicated by printing setting data added to the document data.

However, in a case where the printing setting includes a setting value for which a use authority is not given to a requester corresponding to a user ID included in the normal printing request data, the instructing unit 2013 instructs the client device 10 which is a request source of printing to give a notice of a message such as "Authority to perform requested printing is not sufficient. Insufficient authority: color printing", and does not instruct the printing device 203 to perform printing. In this case, the client device 10 plays a role of a notification device that gives a notice to a requester.

On the other hand, in a case where the receiving unit 2011 has received property designating printing request data, the instructing unit 2013 instructs the printing device 203 to print a document indicated by document data included in the property designating printing request data, with respect to each of one or more pieces of user property data included in the property designating printing request data, by the number of copies indicated by the-number-of-printed-copies data corresponding to the user property data included in the property designating printing request data, in accordance with a printing setting indicated by printing setting data corresponding to the user property data acquired from the storage device 202 by the acquiring unit 2012.

In a case where the instructing unit 2013 instructs the printing device 203 to perform printing in accordance with property designating printing request data, the instructing unit 2013 gives the instruction without instructing the client device 10 to give a notice of a message such as in printing based on normal printing request data even when the printing is performed based on a printing setting including a setting value for which a use authority is not given to a requester.

A reason for the instructing unit 2013 to perform the above-mentioned behavior with respect to a requester's authority is as follows. A user of printed matter printed in accordance with normal printing request data is regarded as a requester. For this reason, printing based on a printing setting exceeding an authority given to a requester is not permitted. On the other hand, a user of printed matter printed in accordance with property designating printing request data is a user having a property shown by user property data. For this reason, a requester's authority in the printing is not considered.

Meanwhile, printing setting data corresponding to user property data is set in advance so as to indicate a printing setting within a range of an authority given to a user having a property indicated by the user property data. Accordingly, printing is based on a printing setting indicated by printing setting data corresponding to user property data, printing exceeding a user's authority is not performed. A configuration is adopted in which in a case where the instructing unit 2013 instructs the printing device 203 to perform printing in accordance with property designating printing request data for the above-mentioned reason, the printing is performed even when the instruction is an instruction for printing which exceeds an authority given to a requester.

Figure 5:
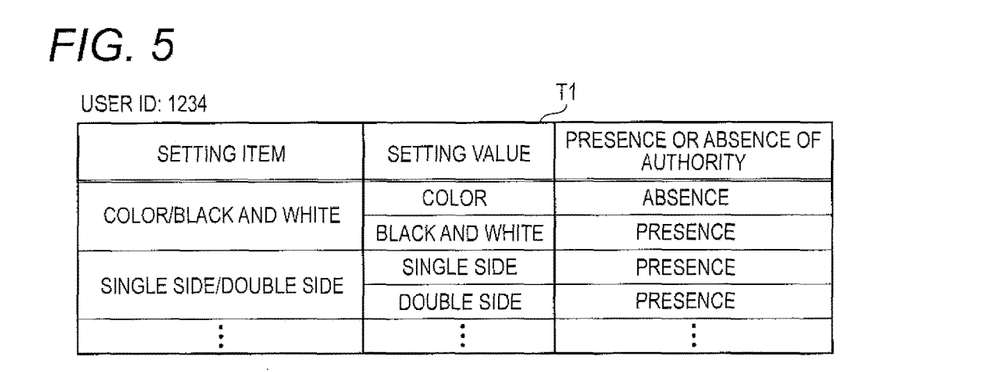
FIG. 5 is a diagram showing a data configuration of a requester authority table according to the first exemplary embodiment.

The storage device 202 stores a requester authority table T1 and a printing setting table T2 in advance. FIG. 5 is a diagram showing a data configuration of the requester authority table T1. The storage device 202 stores requester authority tables T1 respectively corresponding to various requesters. FIG. 5 shows a requester authority table T1 corresponding to a requester identified as a user ID "1234" among the requester authority tables T1.

The requester authority table T1 includes a field of [setting item] in which data indicating a setting item of a printing setting is stored, a field of [setting value] in which data indicating a setting value selectable with respect to a setting item is stored, and a field of [presence or absence of authority] in which data indicating whether or not a requester has an authority to perform printing based on a setting value is stored.

Figure 6:
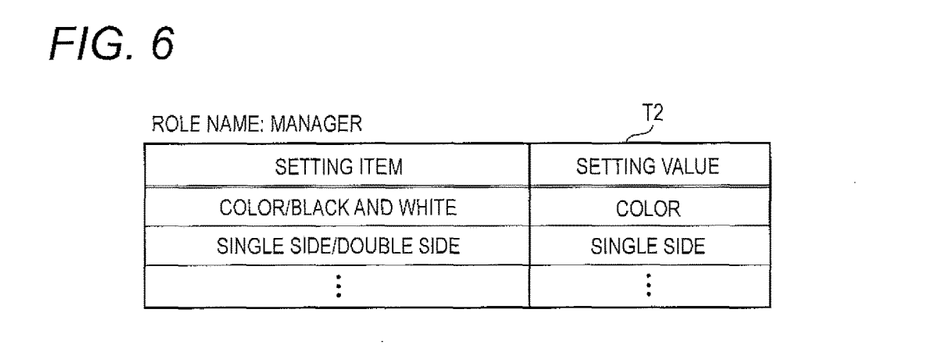
FIG. 6 is a diagram showing a data configuration of a printing setting table according to the first exemplary embodiment.

FIG. 6 is a diagram showing a data configuration of the printing setting table T2. The storage device 202 stores printing setting tables T2 corresponding to respective properties of various users. In this exemplary embodiment, a managerial position such as a "manager" or a "general staff" or a position such as a "customer" is assumed as a user's property. Accordingly, a user's property will be referred to as a "role" below. Meanwhile, types of a user's properties which are adopted in the printing system 1 are not limited to a user's managerial position and position, and include various properties to be considered such as a user's physical properties, for example, "senior" and "partial color blindness" and a use, for example, "for review" or "for presentation" in which a user uses printed matter.

FIG. 6 shows a printing setting table T2 corresponding to a role identified as a role name "manager" among printing setting tables T2 corresponding to various roles. The printing setting table T2 includes a field of [setting item] in which data indicating a setting item of a printing setting is stored, and a field of [setting value] in which data indicating a setting value selected with respect to a setting item is stored.

Subsequently, the operation of the printing system 1 will be described. First, a requester requests the UI unit 156 of the client device 10 to print a document. The requester can select a normal printing request screen for requesting normal printing in which a role is not designated, and a roll printing request screen for requesting printing by designating a role, in the UI unit 156.

Figure 7:
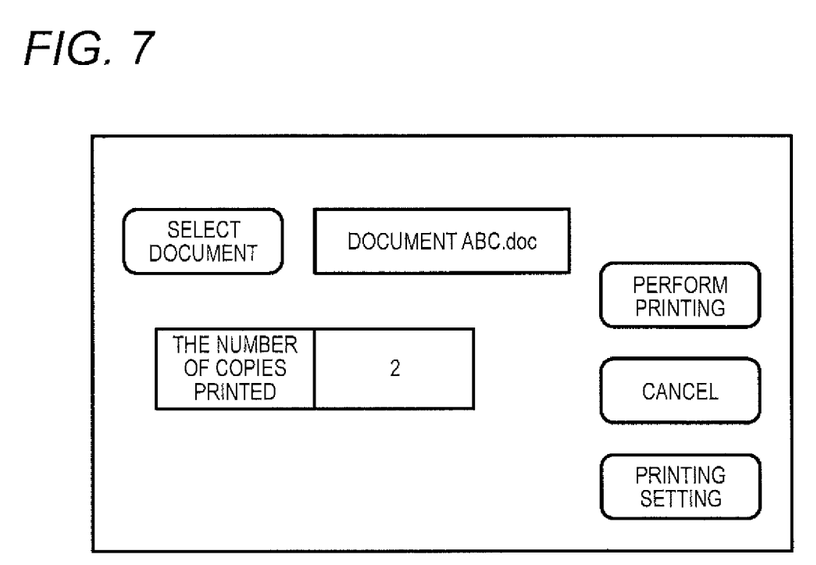
FIG. 7 is a diagram showing a normal printing request screen according to the first exemplary embodiment.

FIG. 7 is a diagram showing a normal printing request screen. In the normal printing request screen, a requester designated a document to be printed and the number of copies. In addition, the requester touches a button of "printing setting" as necessary and makes a change to a predetermined printing setting in a printing setting screen displayed. Thereafter, when the requester touches a button of "printing execution", the client device 10 generates printing request data indicating a request for printing which is instructed by the requester, and transmits the generated data to the image forming apparatus 20.

In this case, the printing request data which is generated by the client device 10 and is transmitted to the image forming apparatus 20 is normal printing request data including a user ID for identifying a requester, document data indicating a document to be printed, and the-number-of-printed-copies data indicating the number of copies. Meanwhile, a predetermined printing setting or printing setting data, indicating a printing setting obtained after a requester makes a change to the predetermined printing setting in the printing setting screen, is added to document data included in the normal printing request data.

Figure 8:
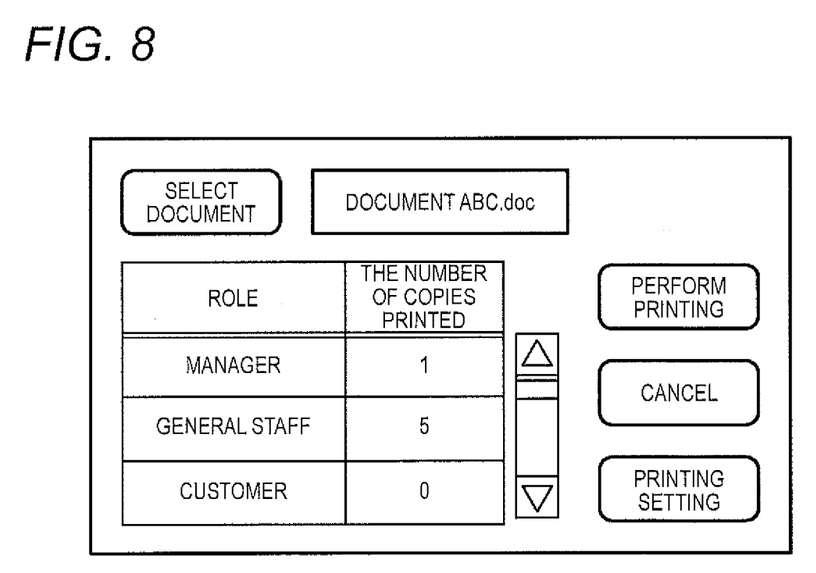
FIG. 8 is a diagram showing a role printing request screen according to the first exemplary embodiment.

FIG. 8 is a diagram showing a roll printing request screen. In the role printing request screen, first, a requester selects a document to be printed. Subsequently, the requester inputs the number of copies corresponding to the number of users with respect to each of roles of users of printed matter.

For example, in a case where a requester desires to print a material for a conference in which one manager and five general staffs participate, the requester designates document data indicating the material for the conference in a roll printing request screen, and then inputs "1" to "the number of copies" of a role of "manager" and inputs "5" to "the number of copies" of a role of "general staff".

In addition, the requester touches a button of "printing setting" as necessary and makes a change to a predetermined printing setting in a printing setting screen displayed, similar to the case of the normal printing request screen. In a case where the requester gives an instruction for printing in the role printing request screen, a predetermined printing setting or a printing setting obtained after the requester makes a change to the predetermined printing setting in the printing setting screen is not generally used. This is because a printing setting corresponding to a role designated by the requester is used in the image forming apparatus 20. However, in a case where a printing setting corresponding to the role designated by the requester is not stored in a printing setting table T2 stored in the image forming apparatus 20, a predetermined printing setting or a printing setting obtained after the requester makes a change to the predetermined printing setting in the printing setting screen is used in printing for the role. For this reason, the requester makes a change to a printing setting in the printing setting screen as necessary.

Thereafter, the requester touches a button of "printing execution", the client device 10 generates printing request data indicating a request for printing designated by the requester, and transmits the generated data to the image forming apparatus 20. In this case, the printing request data which is generated by the client device 10 and is transmitted to the image forming apparatus 20 is property designating printing request data including a user ID for identifying a requester, document data indicating a document to be printed, one or more pieces of user property data indicating a user's property (that is, a role), and the-number-of-printed-copies data indicating the number of copies respectively corresponding to one or more pieces of user property data.

Figure 9:
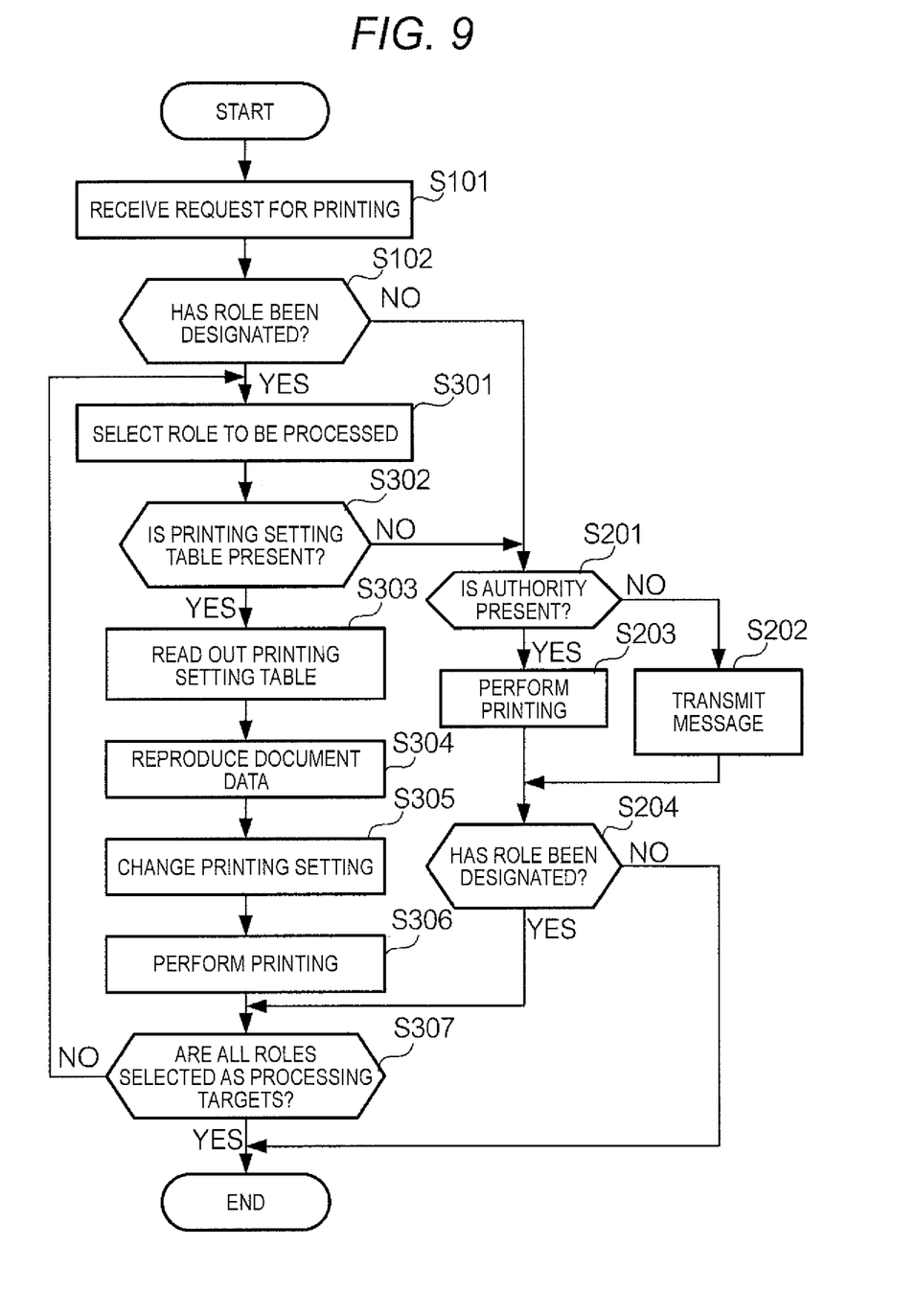
FIG. 9 is a diagram showing a flow of a process performed by the image forming apparatus according to the first exemplary embodiment in association with the printing of a document.

The image forming apparatus 20 prints a document in accordance with printing request data (normal printing request data or property designation printing request data) which is transmitted from the client device 10 in response to a requester's instruction for printing. FIG. 9 is a diagram showing a flow of a process performed by the image forming apparatus 20 in association with the printing of a document.

Printing request data transmitted from the client device 10 is received by the receiving unit 2011 included in the data processing device 201 of the image forming apparatus 20 (step S101). The data processing device 201 determines whether or not the printing request data acquired by the receiving unit 2011 is property designating printing request data, that is, whether user property data indicating a role is included in the printing request data (step S102).

In a case where the printing request data is not property designating printing request data (step S102; NO), the data processing device 201 determines whether or not a printing setting indicated by printing setting data added to document data included in the printing request data is within a range of an authority of a requester identified by a user ID included in the printing request data with reference to the requester authority table T1 (FIG. 5) corresponding to the user ID (step S201).

In the determination of step S201, in a case where it is determined that the printing setting indicated by the printing setting data added to the document data exceeds an authority of a requester (step S201; NO), the instructing unit 2013 of the data processing device 201 generates notification instructing data for instructing a notice of a message of, for example, "Authority to perform requested printing is not sufficient. Insufficient authority: XXXX", and transmits the generated data to the client device 10 which is a transmission source of printing request data (step S202).

After the process of step S202, the data processing device 201 determines whether or not the printing request data received in step S101 is property designating printing request data (step S204). In this case, the printing request data received in step S101 is not property designating printing request data (step S204; NO). In this case, the image forming apparatus 20 terminates a series of processes.

In the determination of step S201, in a case where it is determined that the printing setting indicated by the printing setting data added to the document data is within a range of an authority of a requester (step S201; YES), the instructing unit 2013 of the data processing device 201 instructs the printing device 203 to print a document indicated by document data by the number of copies indicated by the-number-of-printed-copies data included in printing request data in accordance with the printing setting. The printing device 203 prints a document in accordance with an instruction given by the instructing unit 2013 (step S203). The processes of steps S201 to S203 are normal printing processes.

In the determination of step S102, in a case where it is determined that the printing request data is property designating printing request data (step S102; YES), the acquiring unit 2012 of the data processing device 201 selects one piece of user property data to be processed among one or more pieces of user property data included in the printing request data (step S301). A rule of the selection in step S301 may be any rule such as being accordance with an order in which user property data is included in printing request data.

Subsequently, the acquiring unit 2012 determines whether or not the printing setting table T2 (FIG. 6) according to a role indicated by the user property data to be processed which is selected in step S301 is stored in the storage device 202 (step S302). In a case where the printing setting table T2 according to the user property data to be processed is not stored in the storage device 202 (step S302; NO), the image forming apparatus 20 performs the process of step S201 and the subsequent processes, that is, normal printing processes. In this case, the printing request data received in step S101 is property designating printing request data (step S204; YES). In this case, the data processing device 201 determines whether or not all of the pieces of user property data included in the printing request data have been selected as processing targets in step S301 (step S307).

In the determination of step S307, in a case where it is determined that all of the pieces of user property data included in the printing request data have been selected as processing targets (step S307; YES), the image forming apparatus 20 terminates a series of processes. On the other hand, in the determination of step S307, in a case where the pieces of user property data included in the printing request data include user property data that has not been yet selected as a processing target (step S307; YES), the image forming apparatus 20 returns to the process of step S301.

In the determination of step S302, in a case where the printing setting table T2 according to a role indicated by user property data to be processed is stored in the storage device 202 (step S302; YES), the acquiring unit 2012 reads out and acquires the printing setting table T2 from the storage device 202 (step S303). Meanwhile, the printing setting table T2 acquired by the acquiring unit 2012 from the storage device 202 is condition data indicating a condition related to a printing setting corresponding to user property data in this exemplary embodiment.

Subsequently, the instructing unit 2013 reproduces document data included in printing request data (step S304), and changes printing setting data added to the reproduced document data so that the printing setting data indicates a printing setting indicated by the printing setting table T2 which is read out by the acquiring unit 2012 (step S305).

Subsequently, the instructing unit 2013 instructs the printing device 203 to print a document indicated by document data by the number of copies indicated by the-number-of-printed-copies data corresponding to user property data to be processed which is included in printing request data, in accordance with a printing setting indicated by the changed printing setting data. The printing device 203 prints a document in accordance with an instruction given by the instructing unit 2013 (step S306).

Subsequently, the data processing device 201 performs determination of step S307, that is, determines whether or not all of the pieces of user property data included in the printing request data have been selected as processing targets in step S301. In a case where the pieces of user property data included in the printing request data include user property data that has not been yet selected as a processing target (step S302; NO), the image forming apparatus 20 returns to the process of step S301 to select user property data which is a new processing target and performs the process of step S302 and the subsequent processes on the selected user property data of the processing target.

In a case where the process of step S302 and the subsequent processes performed on all of the pieces of user property data included in the printing request data, which are processing targets, have been completed (step S307; YES), the image forming apparatus 20 terminates a series of processes.

According to the printing system 1 mentioned above, a requester gives an instruction for printing in the normal printing request screen (FIG. 7), and thus the user can print a document based on a printing setting within a range of the user's authority by a designated number of copies.

In addition, according to the printing system 1 mentioned above, a requester designates the number of copies based on a role of a user of printed matter and the number of users having the role in the roll printing request screen (FIG. 8)

and gives an instruction for printing, and thus it is possible to print a document based on a printing setting corresponding to each of the designated roles by the number of copies corresponding to the role. For example, a requester can obtain pieces of printed matter corresponding to respective users having different properties, like one pieces of printed matter for a manager (for example, printed matter color printing or printed matter of simplex printing) and five pieces of printed matter for a general staff (for example, printed matter of black and white printing or printed matter of duplex printing).

At this time, a requester does not need to perform an operation for a printing setting corresponding to each of roles of users. In addition, in a case where users include users having different roles, a requester can perform necessary printing in accordance with one instruction for printing without repeating an instruction for printing for each of different roles.

Second Exemplary Embodiment

Hereinafter, a printing system 2 according to a second exemplary embodiment of the invention will be described. A configuration of the printing system 2 is the same as the configuration of the printing system 1 shown in FIG. 1. The printing system 2 is the same as the printing system 1 except that a method of determining a printing setting used in an image forming apparatus 20 is different in a case where a requester gives an instruction for printing in which a role is designated in a roll printing request screen. Accordingly, a difference between the printing system 2 and the printing system 1 will be described below, and portions of the printing system 2 which are common to the printing system 1 will not be described.

In the following description, components, included in the printing system 2, which are common to the printing system 1 are denoted by the same reference numerals and signs as those in the printing system 1. In addition, steps in a flow of a process performed by the image forming apparatus 20 of the printing system 2 which are the same as those in the flow of the process performed by the image forming apparatus 20 of the printing system 1 are denoted by the same step numbers as the step numbers used in FIG. 9.

Figure 10:
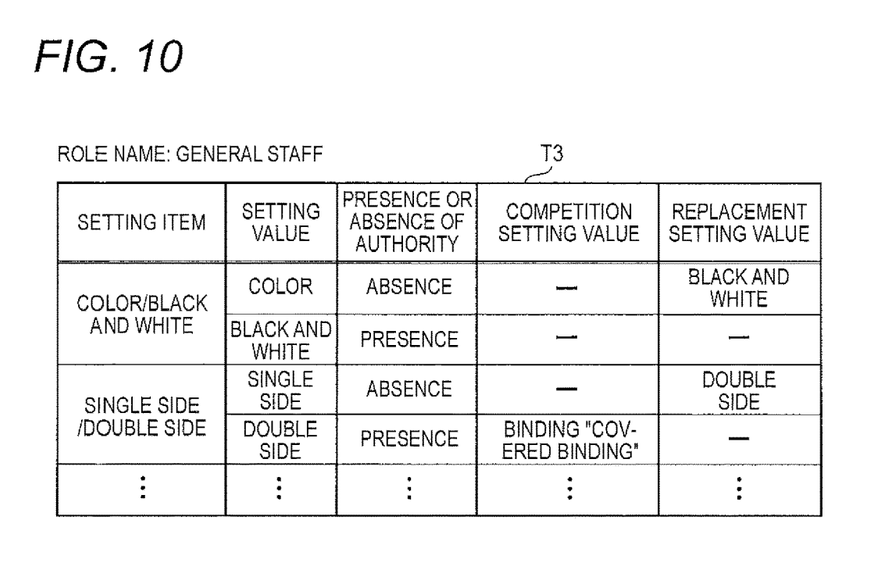
FIG. 10 is a diagram showing a data configuration of a user authority table according to a second exemplary embodiment.

In the printing system 2, a user authority table T3 corresponding to each of various roles is stored in a storage device 202 of the image forming apparatus 20, instead of the printing setting table T2. The user authority table T3 is a table in which data indicating an authority related to a printing setting of a user having the corresponding role is stored. In the printing system 2, a data processing device 201 changes a printing setting used for the printing of a document based on the user authority table T3 (this is described later). FIG. 10 is a diagram showing a data configuration of a user authority table T3. FIG. 10 shows a user authority table T3 corresponding to a role of "general staff".

Similarly to the requester authority table T1 (FIG. 5), the user authority table T3 includes a field of [setting item] in which data indicating a setting item of a printing setting is stored, a field of [setting value] in which data indicating a setting value selectable with respect to a setting item is stored, and a field of [presence or absence of authority] in which data indicating whether or not a requester has an authority to perform printing based on a setting value is stored. In addition, the user authority table T3 includes a field of [competition setting value] in which data indicating a setting value of another competing setting item is stored and a field of [replacement setting value] in which data indicating a setting value to be replaced of the same setting item is stored, with respect to each setting value.

Figure 11:
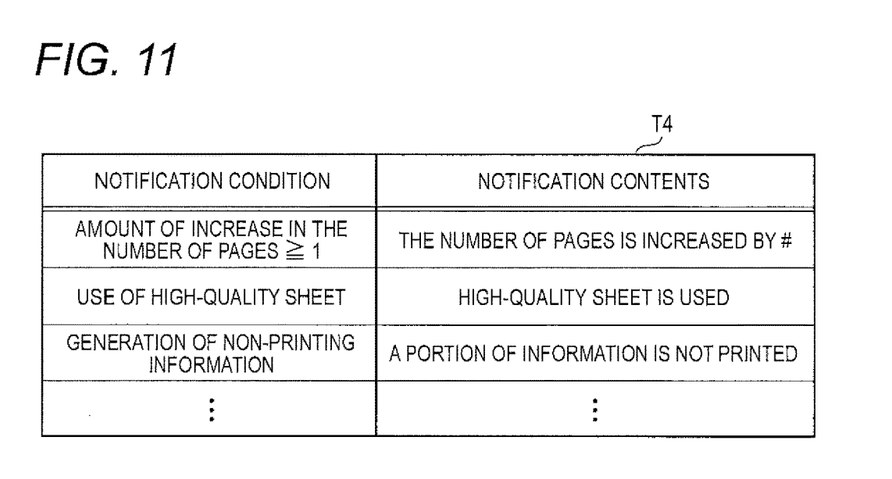
FIG. 11 is a diagram showing a data configuration of a notification condition table according to the second exemplary embodiment.

A notification condition table T4 is further stored in the storage device 202 of the image forming apparatus 20. The notification condition table T4 is a table that stores data indicating a condition in which when a printing setting is changed based on the user authority table T3, a requester has to be notified of the change of the printing setting when which printing setting is changed.

FIG. 11 is a diagram showing a data configuration of a notification condition table T4. The notification condition table T4 includes a field of [notification condition] storing notification condition data indicating a condition for changing a printing setting for which a notice has to be given, and a field of [notification contents] storing data indicating contents of a message of which a requester is notified in a case where a change is made to a printing setting satisfying a condition indicated by notification condition data.

Figure 12A:
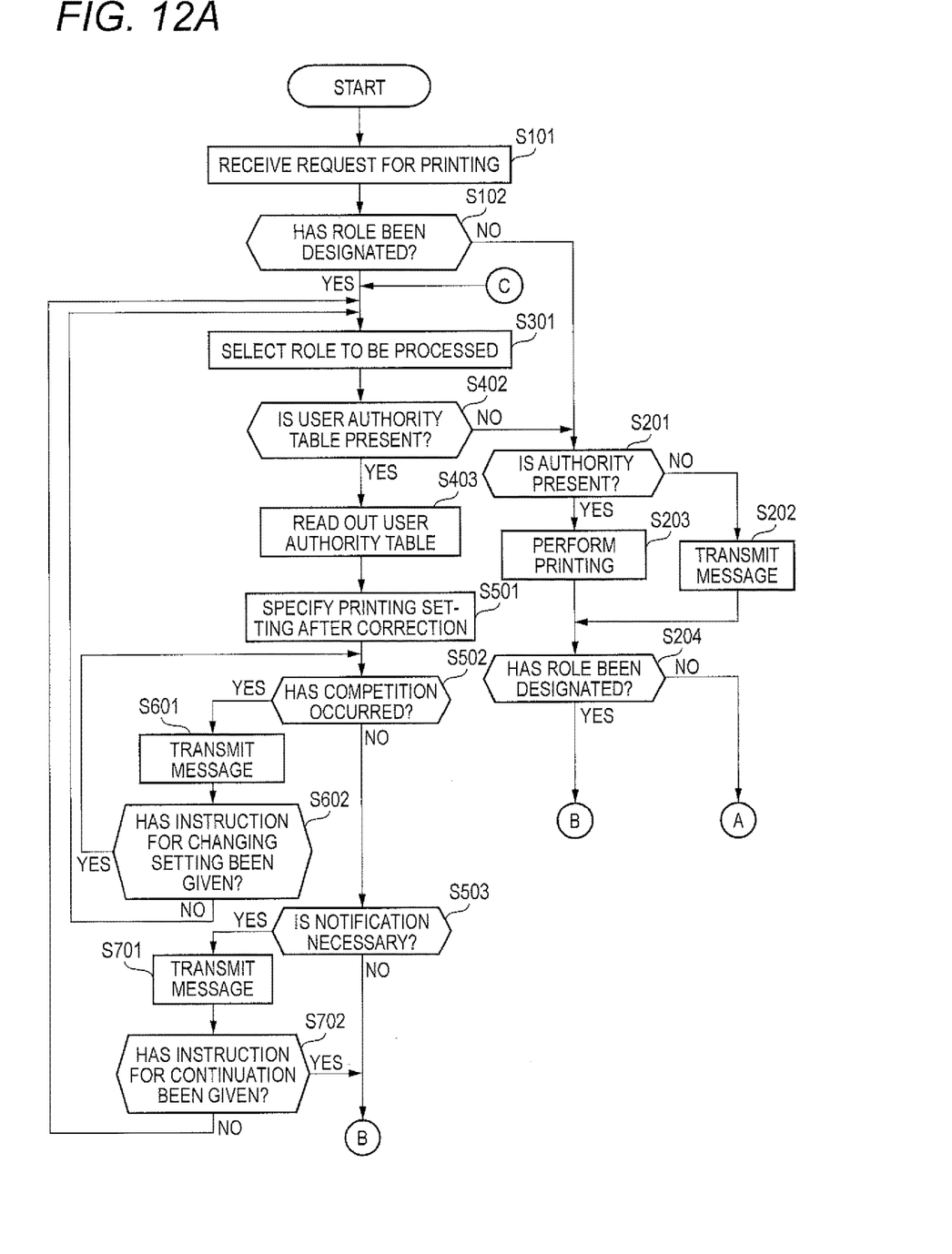
FIG. 12A is a diagram showing a flow of a process performed by an image forming apparatus according to the second exemplary embodiment.
Figure 12B:
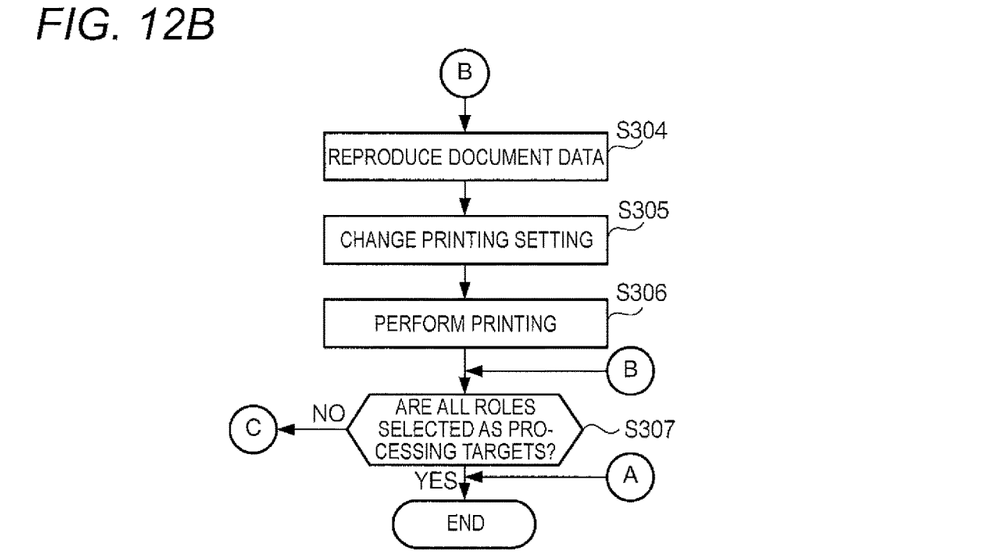
FIG. 12B is a diagram showing a flow of a process performed by an image forming apparatus according to the second exemplary embodiment.

FIGS. 12A and 12B (hereinafter, these will be collectively referred to as "FIG. 12") are diagrams showing a flow of a process performed by the image forming apparatus 20 in accordance with printing request data in the printing system 2. As described above, steps in a process shown in FIG. 12 which are the same as those in the process shown in FIG. 9, which is performed by the image forming apparatus 20 in the printing system 1, are denoted by the same step numbers as the step numbers used in FIG. 9. Hereinafter, steps in the process included in the flow of FIG. 12 which are different from those in the flow of FIG. 9 will be described.

In the printing system 2, an acquiring unit 2012 of the data processing device 201 determines whether or not a user authority table T3 corresponding to a role selected as a processing target is stored in the storage device 202, instead of step S302 (determination of whether or not a printing setting table T2 corresponding to a role selected as a processing target is present) in the printing system 1 (step S402). In a case where a user authority table T3 (FIG. 10) corresponding to a role selected as a processing target is stored in the storage device 202 (step S402; NO), the image forming apparatus 20 performs the process of step S201 and the subsequent processes.

In a case where a user authority table T3 corresponding to a role selected as a processing target is stored in the storage device 202 (step S402; YES), the acquiring unit 2012 reads out and acquires the user authority table T3 from the storage device 202 (step S403). Meanwhile, the user authority table T3 acquired by the acquiring unit 2012 from the storage device 202 is condition data indicating a condition related to a printing setting corresponding to user property data in this exemplary embodiment.

Subsequently, the instructing unit 2013 specifies a printing setting obtained by correcting a setting value of a printing setting indicated by printing setting data added to document data so that the setting value falls within a range of an authority indicated by the user authority table T3 acquired by the acquiring unit 2012 (step S501). Hereinafter, a printing setting indicated by printing setting data added to document data will be referred to as a "printing setting before correction", and a printing setting corrected with respect to a printing setting before correction will be referred to as a "printing setting after correction".

For example, a printing setting before correction includes a setting value of "color" related to a setting item of "color/black and white".

In a case where an authority related to a setting value of "color" related to a setting item of "color/black and white" is not present and a replacement setting value is "black and white" in the user authority table T3 (FIG. 10), the instructing unit 2013 corrects a setting value of "color" of a printing setting before correction to a replacement setting value of "black and white". The instructing unit 2013 performs the above-mentioned correction on all of the setting values that are set not to have an authority in the user authority table T3 among setting values included in the printing setting before correction to thereby specify a printing setting after correction.

Subsequently, the instructing unit 2013 determines whether or not competition occurs between setting values included in the printing setting after correction which is specified in step S501 with reference to the user authority table T3 (FIG. 10) (step S502). For example, in a case where the printing setting after correction includes a setting value of "double side" related to a setting item of "single side/double side" and includes a setting value of "covered binding" related to a setting item of "binding" and these setting values compete with each other in the user authority table T3, the instructing unit 2013 determines that competition occurs in the printing setting after correction (step S502; YES).

In a case where competition occurs in the printing setting after correction (step S502; YES), the instructing unit 2013 generates notification instructing data for instructing the giving of a notice of a message such as "Setting value YYYY and setting value ZZZZ compete with each other. (setting change/cancel)", and transmits the generated data to a client device 10 which is a transmission source of printing request data (step S601).

The client device 10 displays the message on an UI unit 156 in accordance with notification instructing data transmitted from the image forming apparatus 20. A requester performs an operation of instructing the change of either one (or both) of competing setting values so that the notified completion is canceled or instructing cancellation in accordance with the message displayed on the UI unit 156. The client device 10 transmits setting change instructing data for instructing the change of a setting value or cancellation instructing data for instructing the cancellation of printing to the image forming apparatus 20 in accordance with the requester's operation.

A receiving unit 2011 of the data processing device 201 receives setting change instructing data or cancellation instructing data from the client device 10 as a response to the notification instructing data transmitted in step S601. In a case where the data received by the receiving unit 2011 is cancellation instructing data (step S602; NO), the image forming apparatus 20 performs the process of step S301 and the subsequent processes without performing printing related to a role selected as a processing target.

On the other hand, in a case where the data received by the receiving unit 2011 is setting change instructing data (step S602; YES), the instructing unit 2013 changes a setting value indicated by setting change instructing data with respect to a printing setting after correction at the point in time and performs the process of step S502 and the subsequent processes on the printing setting after correction after the change.

In the determination of step S502, in a case where it is determined that competition has not occur in the printing setting after correction (step S502; NO), the instructing unit 2013 determines whether or not a difference between a printing setting after correction and a printing setting after correction satisfies a condition indicated by notification condition data stored in the notification condition table T4 (FIG. 11), that is, whether or not a change from the printing setting before correction to the printing setting after correction is a change requiring the giving of a notice to a requester (step S503).

In a case where it is determined that a change from the printing setting before correction to the printing setting after correction is a change requiring giving a notice to a requester (step S503; YES), the instructing unit 2013 generates notification instructing data for instructing the giving of a notice of a messages such as "Three pages are increased. (continuation/cancellation)" in accordance with notification contents based on the corresponding notification condition shown in the notification condition table T4 (FIG. 11), and transmits the generated data to a client device 10 which is a transmission source of printing request data (step S701).

The client device 10 displays the message on the UI unit 156 in accordance with notification instructing data transmitted from the image forming apparatus 20. A requester performs an operation of instructing the continuation or cancellation of printing in accordance with the message displayed on the UI unit 156. The client device 10 transmits continuation instructing data for instructing the continuation of printing or cancellation instructing data for instructing the cancellation of printing to the image forming apparatus 20 in accordance with the requester's operation.

The receiving unit 2011 of the data processing device 201 receives continuation instructing data or cancellation instructing data from the client device 10 as a response to the notification instructing data transmitted in step S701. In a case where the data received by the receiving unit 2011 is cancellation instructing data (step S702; NO), the image forming apparatus 20 performs the process of step S301 and the subsequent processes without performing printing related to a role selected as a processing target.

In the determination of step S503, in a case where it is determined that a change from the printing setting before correction to the printing setting after correction is not a change requiring the giving of a notice to a requester (step S503; NO) or in a case where the continuation instructing data is received as a response to the notification instructing data transmitted in step S701 (step S702; YES), the image forming apparatus 20 performs a printing process (steps S304 to S306) according to a printing setting after correction with respect to a role to be processed, and then performs the process of step S301 and the subsequent processes.

According to the printing system 2 mentioned above, when a requester designates the number of copies based on a role of a user of printed matter and the number of users having the role in the roll printing request screen (FIG. 8) and gives an instruction for printing, printing is performed in accordance with a printing setting which is corrected so that each of the roles designated by the requester falls within a range of an authority of the role.

Similarly to the case of the printing system 1, regarding the printing system 2, a requester does not need to perform an operation of a printing setting corresponding to each of roles of users. In addition, in a case where users include users having different roles, a requester can perform necessary printing in accordance with one instruction for printing without repeating an instruction for printing for each of different roles.

Modification Example

The above-described exemplary embodiments are just examples for implementing the invention, and may be modified as follows. In addition, the above-described exemplary embodiments and the following modification examples described below may be implemented in combination with each other as necessary.

(1) In the above-described exemplary embodiments, it is assumed that the number of properties (roles) of a user of printed matter is one. When an instruction for printing is given by a requester of printing, a combination of plural properties may be assumed as a property of a user of printed matter.

Figure 13:
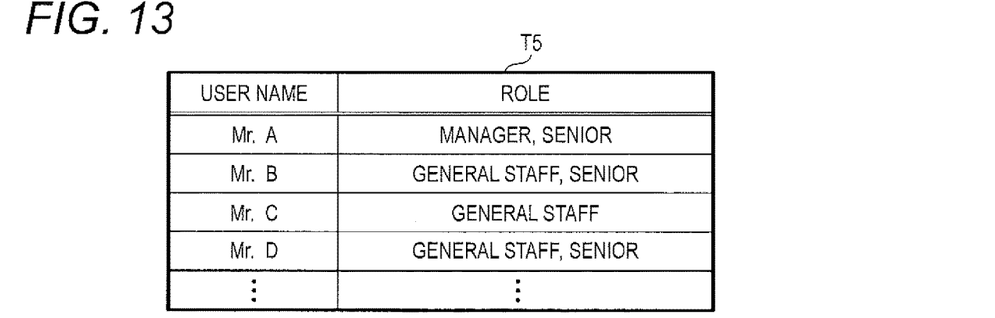
FIG. 13 is a diagram showing a data configuration of a user property table according to a modification example.

In this modification example, for example, a user property table T5 having a data configuration shown in FIG. 13 is stored in the storage device 202. The user property table T5 is a table in which data indicating properties of each of users are stored. The user property table T5 includes a field of [user name] in which data indicating a user name for identifying a user is stored, and a field of [role] in which data indicating properties of a user is stored. Data indicating one or more roles with respect to one user is stored in the field of [role].

Figure 14:
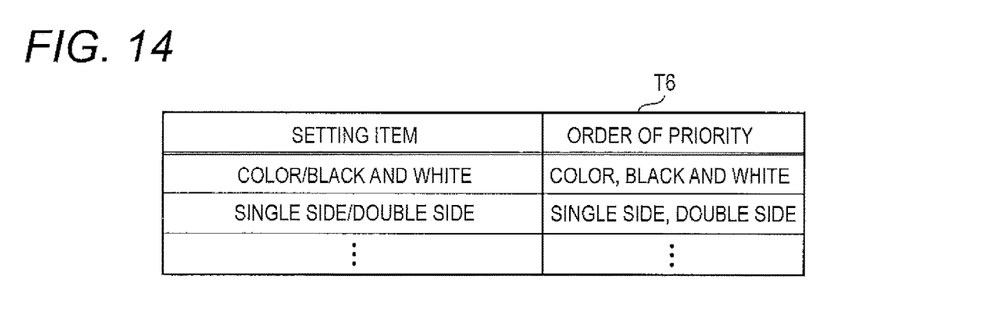
FIG. 14 is a diagram showing a data configuration of a setting value priority table according to a modification example.

In addition, in this modification example, for example, a setting value priority table T6 having a data configuration shown in FIG. 14 is stored in the storage device 202. The setting value priority table T6 is a table in which data indicating the order of priority of selectable setting values is stored with respect to each of setting items of a printing setting. The setting value priority table T6 includes a field of [setting item] in which data indicating a setting item is stored, and a field of [order of priority] in which data indicating setting values, selectable in a setting item, in parallel in descending order of priority is stored.

Figure 15:
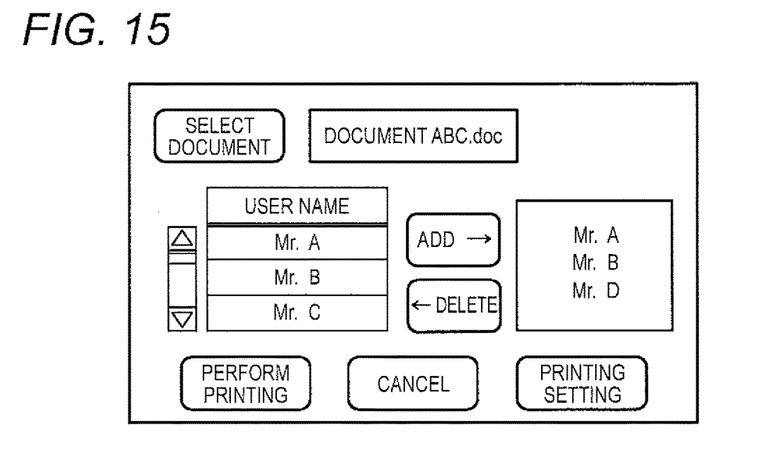
FIG. 15 is a diagram showing a role printing request screen according to a modification example.

In this modification example, a roll printing request screen shown in FIG. 15 is displayed on the UI unit 156 of the client device 10, instead of the roll printing request screen (FIG. 8) displayed in the above-described exemplary embodiment. In the roll printing request screen shown in FIG. 15, a requester selects document data to be printed.

A user of printed matter is selected among user candidates of printed matter which are listed on the left side in the screen, and repeats an operation of touching an "add" button, to thereby designate a user of printed matter.

For example, in a case where the data shown in FIG. 13 is stored in the user property table T5 and "Mr. A", "Mr. B", and "Mr. D" are designated as users of printed matter by a requester as shown in FIG. 15, one copy is designated for a user having two roles of "manager" and "senior", and two copies are designated for a user having two roles of "general staff" and "senior".

Thereafter, when the requester touches a "printing execution" button, property designating printing request data including user property data indicating a combination of plural roles of "manager/senior", the-number-of-printed-copies data indicating the number of copies "1" based on the user property data, user property data indicating a combination of plural roles of "general staff/senior", and the-number-of-printed-copies data indicating the number of copies "2" based on the user property data is transmitted from the client device 10 to the image forming apparatus 20 in the case of the above-mentioned example.

In either a case where this modification example is applied to the printing system 1 or a case where this modification example is applied to the printing system 2, the image forming apparatus 20 performs a process based on printing request data transmitted from the client device 10 in accordance with, for example, a flow (FIG. 12) of a process performed by the image forming apparatus 20 of the printing system 2. However, in a case where the printing system 1 is modified, the table which is a target for the determination in step S402 and the table which is read out in step S403 are the printing setting table T2 (FIG. 6). In a case where printing system 2 is modified, the table which is a target for the determination in step S402 and the table which is read out in step S403 are the user authority table T3 (FIG. 10).

In addition, in a case where user property data which is a processing target indicates a combination of plural roles, the plural printing setting tables T2 or user authority tables T3 corresponding to the plural roles are read out in step S403.

In step S403, the plural printing setting tables T2 or user authority tables T3 are read out, the instructing unit 2013 selects a setting value having the highest priority as a setting value to be adopted, among setting values in the same setting item included in plural printing settings specified in accordance with the respective read-out plural tables, based on the setting value priority table T6 (FIG. 14). The instructing unit 2013 selects a setting value to be adopted as described above with respect to all of the setting items, to thereby specify a printing setting after correction (step S501).

According to this modification example, a requester of printing can perform printing for a user of printed matter which has plural properties.

(2) In the second exemplary embodiment or in the modification example (1), printing is performed in accordance with a printing setting obtained by correcting a printing setting indicated by printing setting data added to document data included in printing request data. For this reason, a problem that a portion of information included in a document indicated by document data is not printed may occur. In the second exemplary embodiment or the modification example (1), in a case where such a problem occurs, a notice to the effect is given to a requester in accordance with the notification condition table T4 (FIG. 11). In a case where such a problem occurs in addition to or instead of the notice, a configuration may be adopted in which a setting value of a printing setting is changed so that the instructing unit 2013 addresses or reduces the problem in accordance with a predetermined rule.

Figure 16:
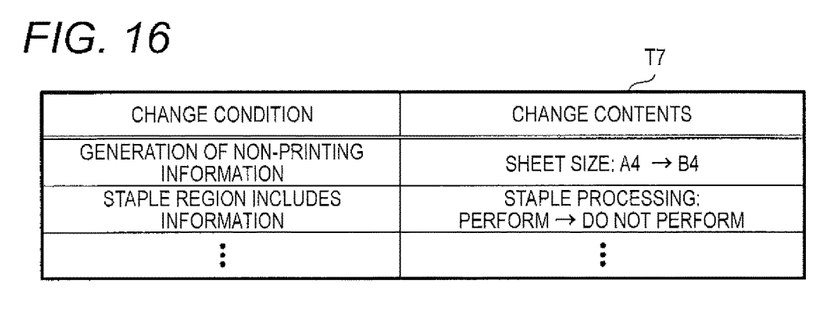
FIG. 16 is a diagram showing a data configuration of a setting value change condition table according to a modification example.

In this modification example, a setting value change condition table T7 having a data configuration shown in FIG. 16 is stored in the storage device 202. The setting value change condition table T7 includes a field of [change condition] that stores change condition data indicating a condition in a case where a printing setting after correction is required to be changed, and a field of [change contents] that stores data indicating a setting value to be changed in a case where the condition is satisfied.

For example, "generation of non-printing information" indicated by data of a first row in the setting value change condition table T7 shown in FIG. 16 indicates a condition in which a portion of information printed in printing based on a printing setting before correction is not printed in printing based on a printing setting after correction.

For example, in a case where letters having a font size smaller than a designated font size are included in a document to be printed, the printing device 203 may have a function of performing printing by enlarging the font sizes of the letters up to the designated font size. In this case, a printing setting may include a setting item of "font enlargement", and a setting value of "minimum font size: 14 point" may be designated in the setting item.

When such a setting value is adopted in a printing setting after correction in the correction of a printing setting which is performed by the instructing unit 2013, for example, a portion of a text disposed within a region having a fixed size may not be printed due to the enlargement of a font size. In this case, the instructing unit 2013 changes a setting value of a setting item of "sheet size" in a printing setting after correction from "A4" to "B4" in accordance with, for example, data of a first row in the setting value change condition table T7. As a result, it is possible to avoid a problem that a portion of information is not printed.

In addition, in a case where a setting value of "perform" of staple processing is adopted in printing based on a printing setting after correction and information is printed in a region on which staple processing is performed due to the enlargement of a font size, or the like, the instructing unit 2013 changes a setting value of staple processing from "perform" to "do not perform" in accordance with, for example, data of a second row in the setting value change condition table T7. As a result, it is possible to avoid a problem that staple processing is performed in a region in which information is printed.

According to the further modification of this modification example, a configuration may be adopted in which in a case where a problem occurs in printing based on a printing setting after correction, a layout of a document is changed so that the instructing unit 2013 addresses or reduces the problem in accordance with a predetermined rule.

Figure 17:
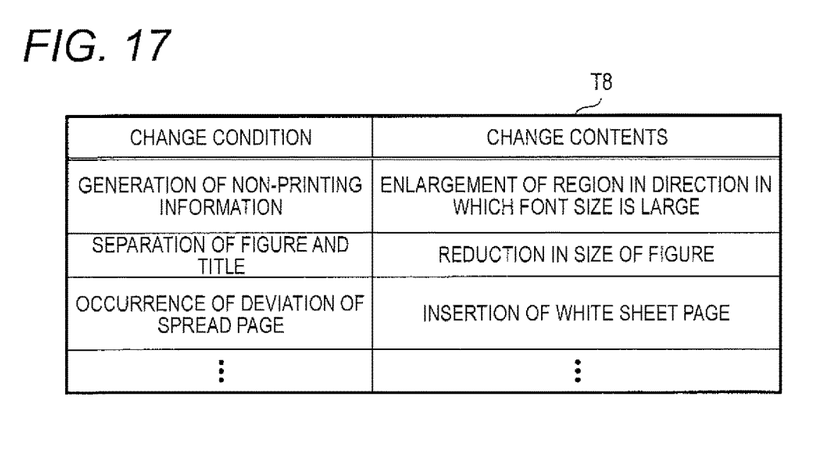
FIG. 17 is a diagram showing a data configuration of a layout change condition table according to a modification example.

In this modification example, a layout change condition table T8 having a data configuration shown in FIG. 17 is stored in the storage device 202. The layout change condition table T8 includes a field of [change condition] that stores change condition data indicating a condition in a case where a printing setting after correction is required to be changed, and a field of [change contents] that stores data indicating a layout changing method to be performed in a case where the condition is satisfied.

For example, in a case where unprinted information is generated due to the enlargement of a font size, or the like in printing based on a printing setting after correction, the instructing unit 2013 enlarges a region in which unprinted information is generated, in a direction in which a text having the largest font size is disposed in the vicinity of the region until unprinted information is not generated, in accordance with, for example, data of a first row in the layout change condition table T8 shown in FIG. 17. At the same time, the instructing unit 2013 reduces the font size of a text disposed in a direction in which the region is enlarged. Thereby, the generation of unprinted information is avoided.

In addition, in a case where a figure is sent to the next page due to the enlargement of a font size, or the like and the figure and a title of the figure which is disposed above the figure are separated into different pages in printing based on a printing setting after correction, the instructing unit 2013 reduces the size of the figure so that the figure is printed on the original page together with the title, in accordance with, for example, data of a second row in the layout change condition table T8 shown in FIG. 17. Thereby, the figure and the title are avoided being separated.

In addition, in a case where a portion of information to be printed on a spread page is sent to the next page due to the enlargement of a font size, or the like and the subsequent spread pages (a combination of an odd-numbered page and an even-numbered page) deviates in printing based on a printing setting after correction, the instructing unit 2013 inserts a white sheet page before a page starting to deviate in accordance with, for example, data of a third row in the layout change condition table T8 shown in FIG. 17. Thereby, the deviation of a spread page is avoided.

(3) Functions provided by the image forming apparatus 20 according to the above-described exemplary embodiment may be provided by being divided by plural devices. For example, the data processing device 201, the storage device 202, and the printing device 203 may be configured as different devices. In addition, the receiving unit 2011 and the acquiring unit 2012 that are included in the data processing device 201 may be disposed in a first device, the instructing unit 2013 may be disposed in a second device, and the devices may be configured to operate in association with each other.

(4) The data and processing flows used in the description of the above-described exemplary embodiments and the modification examples are examples, and the invention is not limited thereto.

(5) In the above-described exemplary embodiments, a program executed by the CPU 251 of the image forming apparatus 20 may be used by being downloaded to the image forming apparatus 20 through a communication line such as the Internet. In addition, the program may be used by being provided in a state of being stored in a recording medium that consistently stores data and being read from the recording medium by the image forming apparatus 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing device comprising:
a processor programmed to
receive printing request data which indicates a request for printing of a document, the printing request data including a plurality of pieces of user property data each indicating a property of a user of a printed matter and number-of-printed-copies data indicating a preset number of copies defined for each of the plurality of pieces of user property data,
acquire, from a storage device that stores condition data indicating a condition related to a printing setting corresponding to each of the plurality of pieces of user property data, the condition data corresponding to the user property data with respect to each of the plurality of pieces of user property data, and
instruct a printing device to print the document by the preset number of copies indicated by the number-of-printed-copies data corresponding to the user property data based on a printing setting satisfying a condition indicated by the condition data corresponding to the user property data with respect to each of the plurality of pieces of user property data.

2. The data processing device according to claim 1, wherein the condition data indicates a combination of one or more setting values in the printing setting, and
the processor is further programmed to instruct to print based on a combination of one or more setting values included in the printing setting indicated by the condition data in an instruction to print with respect to each of the plurality of pieces of user property data.

3. The data processing device according to claim 1, wherein the processor is further programmed to receive printing setting data indicating a printing setting for the document, the condition data indicates presence or absence of an authority to perform printing based on a setting value in a printing setting, and the processor is further programmed to change a setting value which is unauthorized based on the condition data corresponding to the user property data to a setting value which is authorized among one or more setting values included in the printing setting indicated by the printing setting data, and instruct to print based on the printing setting having the changed setting value in an instruction to print with respect to each of the plurality of pieces of user property data.

4. The data processing device according to claim 1, wherein there is a case where the processor receives the printing request data including the user property data indicating a plurality of properties with respect to one user, and in a case where the user property data with respect to the one user which is included in the printing request data indicates the plurality of properties, the processor selects a setting value to be adopted in accordance with a predetermined rule among setting values included in a printing setting satisfying a condition indicated by condition data corresponding to each of the plurality of properties with respect to each of one or more setting items of a printing setting, and instructs to print based on the printing setting including the selected setting value.

5. The data processing device according to claim 1, wherein, in a case where a document, which is printed in accordance with the printing setting satisfying the condition indicated by the condition data corresponding to the user property data included in the printing request data, satisfies a predetermined condition, the processor instructs a notification device to give a notice to a requester having made a request for printing indicated by the printing request data.

6. The data processing device according to claim 1, wherein, the processor is further programmed to determine whether a competition occurs between setting values included in the printing setting satisfying the condition indicated by the condition data corresponding to the user property data included in the printing request data, and in a case where the processor determines that the competition occurs, the processor instructs a notification device to give a notice to a requester having made a request for printing indicated by the printing request data.

7. The data processing device according to claim 1, wherein, in a case where a document, which is printed in accordance with the printing setting satisfying the condition indicated by the condition data corresponding to the user property data included in the printing request data, satisfies a predetermined condition, the processor changes one or more setting values included in the printing setting in accordance with a predetermined rule.

8. The data processing device according to claim 1, wherein, in a case where a document, which is printed in accordance with the printing setting satisfying the condition indicated by the condition data corresponding to the user property data included in the printing request data, satisfies a predetermined condition, the processor changes a layout of the document in accordance with a predetermined rule.

9. The data processing device according to claim 1, wherein the property of the user indicates at least one of a role of the user and a physical property of the user.

10. A data processing device comprising:

a processor programmed to receive printing request data which indicates a request for printing of a document, the printing request data further including number-of-printed-copies data indicating a number of copies, there being a case where the processor receives printing request data that further includes one or more pieces of user property data indicating a property of a user of a printed matter and number-of-printed-copies data indicating a preset number of copies defined based on each of the one or more pieces of user property data and a case where the processor receives printing request data that does not include the user property data, acquire, from a storage device that stores condition data indicating a condition related to a printing setting corresponding to each of the one or more pieces of user property data, the condition data corresponding to the user property data with respect to each of the one or more pieces of user property data, and instruct a printing device to print the document by the number of copies indicated by the number-of-printed-copies data, wherein, in a case where the processor receives the printing request data that does not include the user property data, the processor does not give an instruction to print based on a printing setting including a setting value for which an authority is not given to a requester having made a request for printing indicated by the printing request data in an instruction to print based on the printing request data, and in a case where the processor receives the printing request data that includes the user property data, the processor gives an instruction to print based on a printing setting satisfying a condition indicated by the condition data based on the user property data included in the printing request data regardless of presence or absence of an authority of the requester having made a request for printing indicated by the printing request data in an instruction to print based on the printing request data.

11. A non-transitory computer readable medium storing a program causing a computer to:

receive printing request data which indicates a request for printing of a document, the printing request data including a plurality of pieces of user property data each indicating a property of a user of a printed matter and number-of-printed-copies data indicating a preset number of copies defined for each of the plurality of pieces of user property data, acquire, from a storage device that stores condition data indicating a condition related to a printing setting corresponding to each of the plurality of pieces of user property data, the condition data corresponding to the user property data with respect to each of the plurality of pieces of user property data, and instruct a printing device to print the document by the preset number of copies indicated by the number-of-printed-copies data corresponding to the user property data based on a printing setting satisfying a condition indicated by the condition data corresponding to the user property data with respect to each of the plurality of pieces of user property data.

* * * * *